US009777809B2

(12) United States Patent
Hirayama et al.

(10) Patent No.: US 9,777,809 B2
(45) Date of Patent: Oct. 3, 2017

(54) CHAIN GUIDE

(71) Applicant: TSUBAKIMOTO CHAIN CO., Osaka-shi, Osaka (JP)

(72) Inventors: Manabu Hirayama, Osaka (JP); Ryo Segawa, Osaka (JP); Kaori Mori, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 15/292,415

(22) Filed: Oct. 13, 2016

(65) Prior Publication Data
US 2017/0114873 A1  Apr. 27, 2017

(30) Foreign Application Priority Data

Oct. 21, 2015  (JP) .................................. 2015-207376

(51) Int. Cl.
*F16H 7/08* (2006.01)
*F16H 7/18* (2006.01)

(52) U.S. Cl.
CPC ......... *F16H 7/18* (2013.01); *F16H 2007/185* (2013.01)

(58) Field of Classification Search
CPC ...... F16H 7/18; F16H 2007/0872; F16H 7/08; F16H 2007/0893; F16H 2007/0804
USPC ........................................................ 474/111
See application file for complete search history.

(56) References Cited

U.S. PATENT DOCUMENTS

| 5,222,917 | A | * | 6/1993 | Shimaya | F16H 7/08 474/101 |
| 5,318,482 | A | * | 6/1994 | Sato | F16H 7/08 474/111 |
| 6,013,000 | A | * | 1/2000 | Moretz | F16H 7/08 474/111 |
| 6,302,816 | B1 | * | 10/2001 | Wigsten | F16H 7/18 474/111 |
| 6,669,590 | B2 | * | 12/2003 | Kawano | F16H 7/18 474/111 |
| 6,692,390 | B2 | * | 2/2004 | Ono | F16H 7/18 474/111 |
| 6,733,409 | B2 | * | 5/2004 | Konno | F16H 7/18 474/111 |

(Continued)

FOREIGN PATENT DOCUMENTS

JP          2015-25535 A    2/2015

*Primary Examiner* — Henry Liu
(74) *Attorney, Agent, or Firm* — Westerman, Hattori, Daniels & Adrian, LLP

(57) ABSTRACT

To provide a chain guide that implements stable running of a chain, causes less wear or damage on the inner surface of mounting holes or on mounting shafts, and improves the durability of a reinforcing plate thereof without increasing production cost. A guide shoe includes a guide rail and a plate holding part accommodating a reinforcing plate inserted thereinto from the backside of the guide rail. The reinforcing plate includes a tubular part integral with a first plate surface and protruding from the edge of a mounting hole that extends through the reinforcing plate in a guide width direction. In the chain guide, a plurality of surface irregular parts are provided on a peripheral outer side of the tubular part in stripes along a plurality of imaginary circles concentric to the tubular part on at least one of the first plate surface and a second plate surface.

5 Claims, 3 Drawing Sheets

(56) References Cited

U.S. PATENT DOCUMENTS

| | | | | |
|---|---|---|---|---|
| 6,743,130 B2* | 6/2004 | Konno | F16H 7/18 | 474/111 |
| 6,796,917 B2* | 9/2004 | Konno | F16H 7/18 | 474/111 |
| 6,832,966 B2* | 12/2004 | Kawano | F16H 7/18 | 474/111 |
| 6,835,149 B2* | 12/2004 | Konno | F16H 7/08 | 474/111 |
| 6,843,742 B2* | 1/2005 | Konno | F16H 7/18 | 403/13 |
| 6,849,013 B2* | 2/2005 | Konno | F16H 7/18 | 474/111 |
| 6,849,014 B2* | 2/2005 | Horie | F16H 7/18 | 474/111 |
| 6,884,192 B2* | 4/2005 | Konno | F16H 7/18 | 474/111 |
| 6,890,277 B2* | 5/2005 | Inoue | F16H 7/18 | 474/111 |
| 7,074,145 B2* | 7/2006 | Konno | F16H 7/18 | 474/111 |
| 8,083,623 B2* | 12/2011 | Cantatore | F16H 7/08 | 474/109 |
| 8,430,773 B2* | 4/2013 | Botez | F16H 7/18 | 474/111 |
| 8,876,642 B2* | 11/2014 | Adams | F16H 7/18 | 474/111 |
| 2002/0077204 A1* | 6/2002 | Kumakura | F16H 7/18 | 474/140 |
| 2002/0128100 A1* | 9/2002 | Inoue | F16H 7/18 | 474/111 |
| 2002/0132688 A1* | 9/2002 | Ono | F16H 7/18 | 474/111 |
| 2003/0064842 A1* | 4/2003 | Konno | F16H 7/18 | 474/111 |
| 2003/0064843 A1* | 4/2003 | Konno | F16H 7/18 | 474/111 |
| 2003/0078120 A1* | 4/2003 | Konno | F16H 7/18 | 474/111 |
| 2003/0078121 A1* | 4/2003 | Kawano | F16H 7/18 | 474/111 |
| 2003/0078122 A1* | 4/2003 | Kawano | F16H 7/18 | 474/111 |
| 2003/0092520 A1* | 5/2003 | Konno | F16H 7/18 | 474/111 |
| 2003/0092521 A1* | 5/2003 | Konno | F16H 7/18 | 474/111 |
| 2003/0134704 A1* | 7/2003 | Konno | F01L 1/024 | 474/111 |
| 2003/0139236 A1* | 7/2003 | Konno | F16H 7/18 | 474/111 |
| 2003/0139237 A1* | 7/2003 | Konno | F16H 7/18 | 474/111 |
| 2003/0139238 A1* | 7/2003 | Konno | F16H 7/18 | 474/111 |
| 2003/0144099 A1* | 7/2003 | Horie | F16H 7/18 | 474/111 |
| 2003/0144100 A1* | 7/2003 | Konno | F16H 7/18 | 474/111 |
| 2003/0144101 A1* | 7/2003 | Konno | F16H 7/08 | 474/111 |
| 2004/0147350 A1* | 7/2004 | Kurohata | F16H 7/18 | 474/111 |
| 2004/0214672 A1* | 10/2004 | Thomas | F16H 7/18 | 474/111 |
| 2005/0026730 A1* | 2/2005 | Hashimoto | F16H 7/18 | 474/111 |
| 2005/0049095 A1* | 3/2005 | Shum | F16H 7/08 | 474/140 |
| 2005/0096167 A1* | 5/2005 | Konno | F16H 7/18 | 474/111 |
| 2005/0227800 A1* | 10/2005 | Shum | F16H 7/18 | 474/140 |
| 2005/0239590 A1* | 10/2005 | Foster | B65G 21/22 | 474/140 |
| 2005/0266946 A1* | 12/2005 | Thomas | B29C 45/1635 | 474/111 |
| 2005/0277506 A1* | 12/2005 | Konno | F16H 7/18 | 474/111 |
| 2006/0199689 A1* | 9/2006 | Yoshimoto | F16H 7/18 | 474/111 |
| 2008/0153643 A1* | 6/2008 | Franke | F16H 7/18 | 474/111 |
| 2008/0242460 A1* | 10/2008 | Hewitt | F16H 7/18 | 474/111 |
| 2009/0011879 A1* | 1/2009 | Sakamoto | F16H 7/18 | 474/111 |
| 2009/0105022 A1* | 4/2009 | Cantatore | F16H 7/08 | 474/111 |
| 2010/0292037 A1* | 11/2010 | Botez | F16H 7/18 | 474/111 |
| 2013/0210566 A1* | 8/2013 | Konno | F16H 7/18 | 474/111 |
| 2014/0155208 A1* | 6/2014 | Kato | F02B 67/06 | 474/111 |
| 2014/0256487 A1* | 9/2014 | Ketterl | F16H 7/18 | 474/111 |

* cited by examiner

CHAIN GUIDE

BACKGROUND OF THE INVENTION

1. Field of the Invention

The present invention relates to a chain guide having a guide shoe that slidably guides a chain, and a reinforcing plate that, reinforces the guide shoe.

2. Description of the Related Art

It is common practice to use a chain guide having a guide shoe that slidably guides a running chain to stabilize a chain running between sprockets and to keep an appropriate chain tension. As a system that uses this chain guide, for example, an engine timing system is known, wherein a chain is endlessly wound around sprockets of a crankshaft and cam shafts inside an engine room. A chain guide is used to guide this timing chain endlessly wound around a drive sprocket of the crankshaft and a pair of driven sprockets of the cam shafts inside the engine room.

A guide rail of the chain guide used in such a known timing system should preferably be made of a low-friction, high wear-resistance material, and therefore a guide entirely made of a low-friction resin material is known. On the other hand, the chain guide needs to have certain levels of strength, rigidity, and durability to be able to withstand the tension or vibration of the chain and to guide the chain stably. If the chain guide is made solely of a resin material, it needs to have a larger material thickness to achieve necessary strength, rigidity, and durability, and will end up occupying a larger space inside the engine room. Therefore, some known chain guides have their guide rail made of a low-friction resin material and reinforced with a material with high strength, rigidity, and durability such as metal, so as to reduce the occupying space while securing necessary strength, rigidity, and durability of the chain guide as a whole.

One of such known chain guides is formed by a guide shoe that slidably guides a running chain and a reinforcing plate that reinforces the guide shoe along the guide longitudinal direction. The guide shoe has a plate holding part in the form of a slit-like groove on the backside of the guide rail for allowing insertion of the reinforcing plate from below. With the reinforcing plate having high rigidity and durability being inserted into the plate holding part from below, the occupying space of the chain guide is reduced, while necessary strength, rigidity, and durability are secured as a whole (see Japanese Patent Application Laid-open No. 2015-025535).

SUMMARY OF THE INVENTION

According to Japanese Patent Application Laid-open No. 2015-025535, the chain guide has mounting holes for mounting shafts to pass through, which are used to attach the chain guide to an object of interest such as an engine block. Tubular parts are formed by burring at the edge of the mounting holes such as to protrude from the edge of the mounting holes in the guide width direction. Therefore, the inner surface of the mounting hole and the mounting shaft make contact with each other in an increased area along the width direction, so that the chain guide is unlikely to incline relative to its proper orientation and capable of allowing stable running of the chain. Moreover, with the inner surface of the mounting hole and the mounting shaft making contact with each other in a wider area, they are less susceptible to load concentration, and less likely to suffer wear or damage on the inner surface of the mounting hole and on the mounting shaft.

However, while the tubular parts provide the effects described above in the chain guide described in Japanese Patent Application Laid-open No. 2015-025535, there was another problem in that connecting portions between a flat part of the reinforcing plate that can be warped largely and the tubular parts (base portions of the tubular parts) are more susceptible to concentration of internal stress generated inside the reinforcing plate due to the force applied to the reinforcing plate during the running of the chain, because of which the durability of the reinforcing plate is compromised.

The present invention solves these problems, its object being to provide a chain guide that allows for stable running of a chain, suffers less wear or damage on the inner surface of mounting holes or on mounting shafts, and improves the durability of its reinforcing plate without causing an increase in production cost.

The present invention solves the problems described above by providing a chain guide including a guide shoe that slidably guides a chain, and a reinforcing plate that reinforces the guide shoe, wherein the guide shoe includes a guide rail extending along a guide longitudinal direction, and a plate holding part accommodating the reinforcing plate inserted thereinto from a backside of the guide rail, the reinforcing plate includes a first plate surface on one side thereof in a guide width direction, a second plate surface on an opposite side, a mounting hole extending through the reinforcing plate in the guide width direction, and a tubular part integral with the first plate surface and protruding from an edge of the mounting hole, at least one of the first plate surface and the second plate surface includes a plurality of surface irregular parts, on an outer peripheral side of the tubular part, in stripes along a plurality of imaginary circles concentric to the tubular part.

According to one aspect of the present invention, the reinforcing plate is provided with a tubular part integral with the first plate surface and protruding from an edge of the mounting hole, so that a mounting shaft used for attaching the chain guide to an object of interest such as an engine block can make contact with the inner surface of the mounting hole in an increased area along the guide width direction. This way, the chain guide is less likely to be inclined relative to its proper orientation and can thus allow stable running of the chain. Moreover, with the inner surface of the mounting hole and the mounting shaft making contact with each other in a wider area, the chain guide does not suffer a concentrated load, which results in less wear or damage on the inner surface of the mounting hole and on the mounting shaft, as well as provides the following effects.

Namely, at least one of the first plate surface and the second plate surface of the reinforcing plate includes a plurality of surface irregular parts around the tubular part in stripes along a plurality of imaginary circles concentric to the tubular part. These surface irregular parts can help disperse the internal stress generated inside the reinforcing plate due to the force applied to the reinforcing plate during the running of the chain. Concentration of internal stress at the connecting portions between the flat part and the tubular part of the reinforcing plate is thus avoided and so the durability of the reinforcing plate can be improved.

When the tubular part is formed by a drawing process, corrugations formed to the first plate surface or the second plate surface as a result of the pressing process repeated a number of times on the blank sheet of the reinforcing plate can be utilized as the surface irregular parts. Thus the durability of the reinforcing plate can be improved without requiring any additional process such as cutting or grinding.

According to another aspect of the present invention, the second plate surface includes an annular projection protruding portion at an edge of the mounting hole. This annular projection can function as a seat for a bolt head or the like of the mounting shaft inserted into the mounting hole to sit on, so that the chain guide can be attached to an object of interest in a stable manner. When the tubular part, is formed by a drawing process, the annular projection can be protruded on the second plate surface without requiring any additional process, so that an increase in the processing cost can be avoided.

According to another aspect of the present invention, a flange extending radially outward from the tubular part, is formed at a distal end of the tubular part. This flange can be used as a scat that will make contact with the object of interest such as an engine block to increase the area of contact with the object of interest, so that the chain guide can be attached to an object of interest in a stable manner. When the tubular part, etc., is formed by a drawing process, the flange can be formed at the distal end of the tubular part without requiring any additional process, so that an increase in the processing cost can be avoided.

According to another aspect of the present invention, the mounting hole includes a radially expanded part expanding radially outward relative to the guide width direction at a distal end of the flange. This will facilitate insertion of the mounting shaft into the mounting hole from the flange side. Also, when the tubular part and flange are formed by a drawing process, the radially expanded part can be formed at the distal end of the mounting hole on the flange side without requiring any additional process, so that an increase in the processing cost can be avoided.

DESCRIPTION OF THE PREFERRED EMBODIMENT

Hereinafter, a chain guide 10 according to one embodiment of the present invention will be described with reference to the drawings.

The chain guide 10 according to the embodiment of the present invention is used as part of a timing system equipped inside an engine room and fixed to an engine block E, which is an object to which it is attached, to slidably guide a chain running around sprockets.

Figure 1:
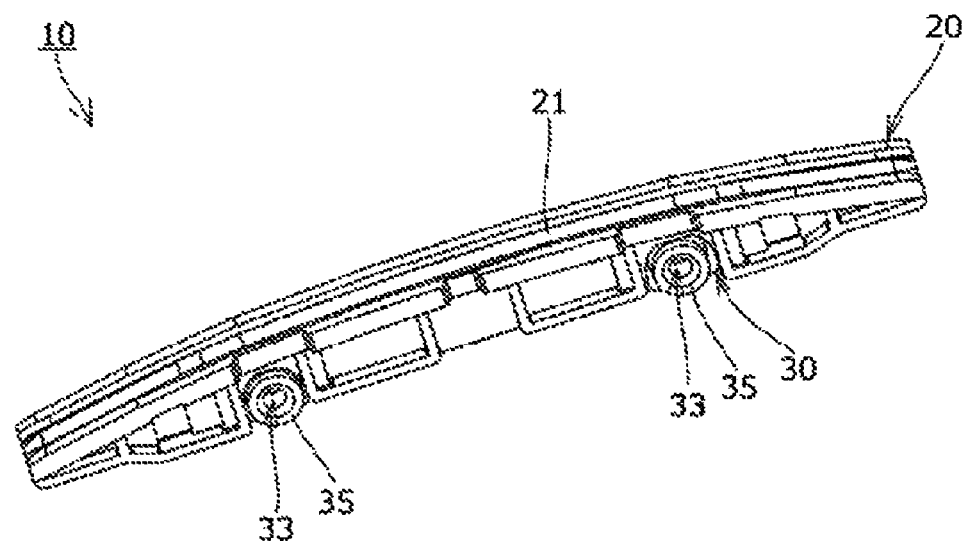
FIG. 1 is a perspective view illustrating a chain guide that is one embodiment of the present invention.
Figure 2:
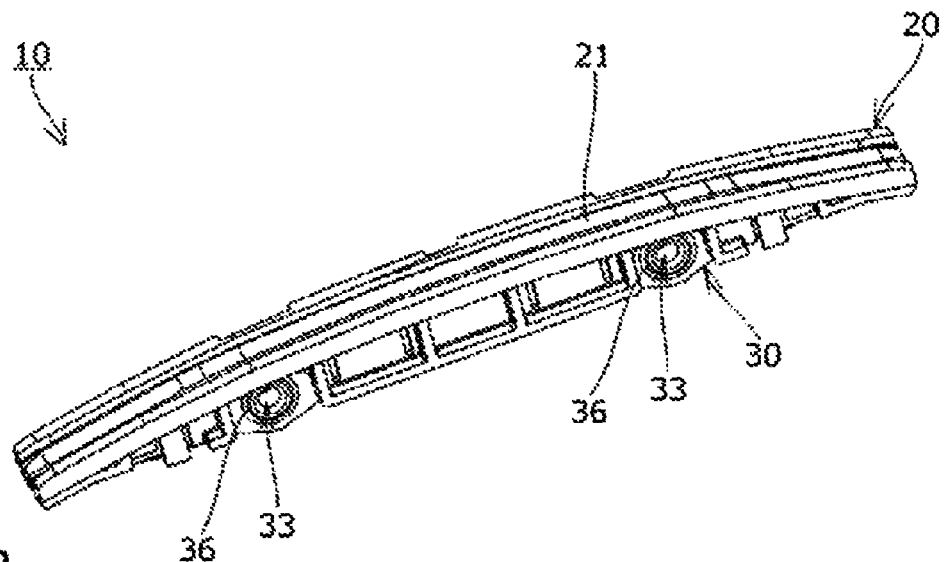
FIG. 2 is a perspective view illustrating the chain guide viewed from a different direction from that of FIG. 1.
Figure 3:
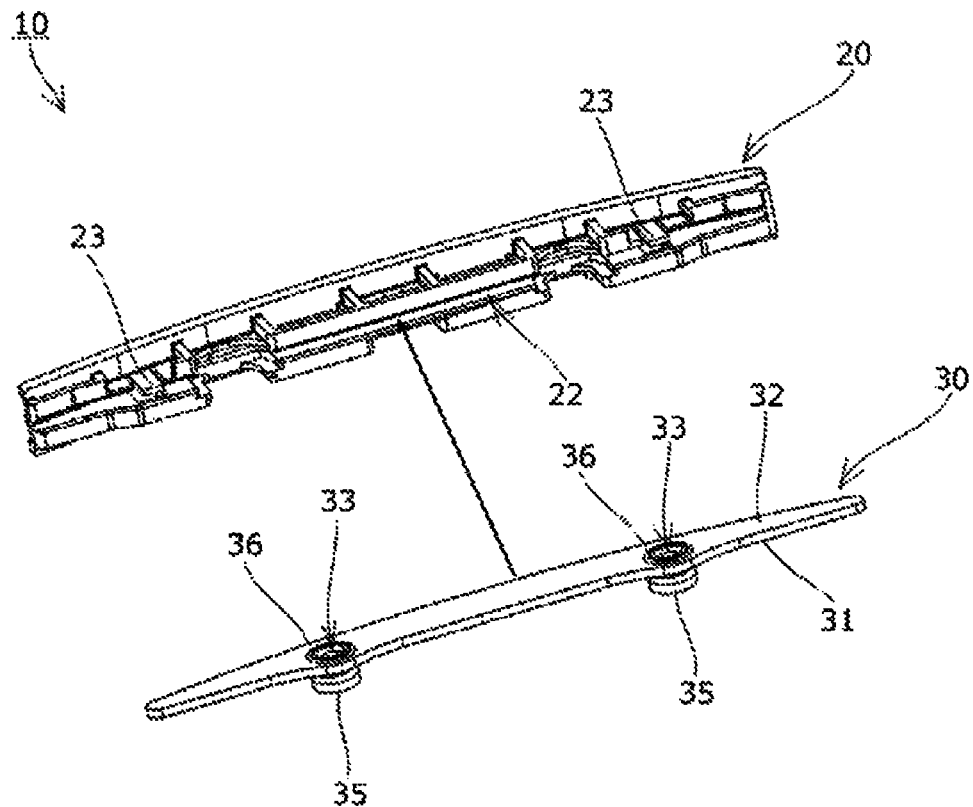
FIG. 3 is an illustrative diagram showing how a reinforcing plate is attached to a guide shoe.

The chain guide 10 includes a guide shoe 20 that slidably guides the running chain along a guide longitudinal direction, and a reinforcing plate 30 removably attached to the guide shoe 20 and reinforces the guide shoe 20, as shown in FIG. 1 to FIG. 3.

The guide shoe 20 has a guide rail 21 that guides the chain along the guide longitudinal direction on the upper side facing the chain, as shown in FIG. 1 and FIG. 2. The guide shoe 20 also has a plate holding part 22 in the form of a slit-like groove for accommodating the reinforcing plate 30 inserted thereinto from the backside of the guide rail 21 (underside of the guide shoe 20) as shown in FIG. 3. The reinforcing plate 30 inserted in this plate holding part 22 is prevented from coming out of the underside of the guide shoe 20 by locking pawls 23 formed to the guide shoe 20.

Figure 4:
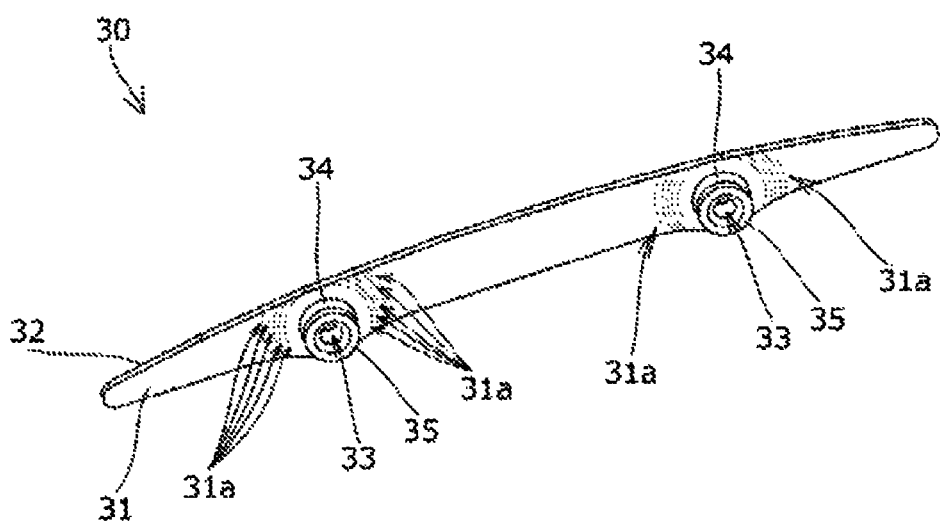
FIG. 4 is a perspective view illustrating the reinforcing plate viewed from a first plate surface side.
Figure 5:
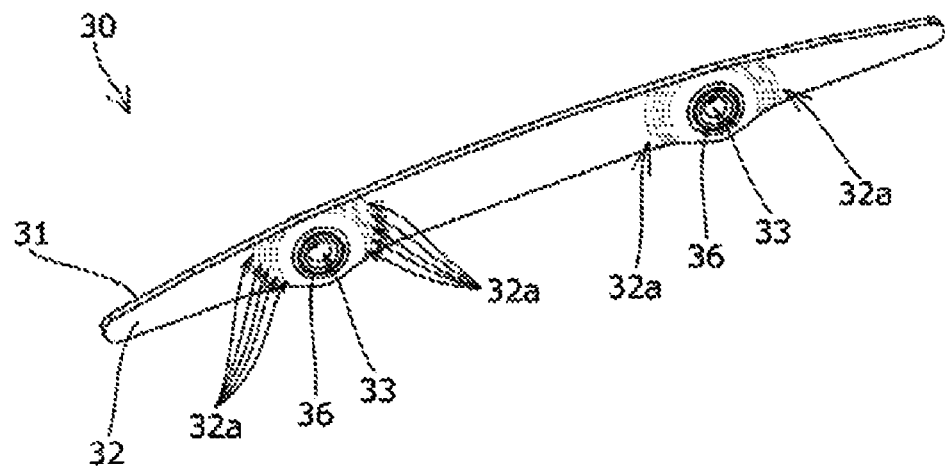
FIG. 5 is a perspective view illustrating the reinforcing plate viewed from a second plate surface side.

The reinforcing plate 30 includes, as shown in FIG. 3 to FIG. 5, a first plate surface 31 on one side of a guide width direction, a second plate surface 32 on the opposite side, two mounting holes 33 extending through in the guide width direction, cylindrical tubular parts 34 each protruding from respective edges of the mounting holes 33 in the guide width direction integrally and continuously from the first plate surface 31, annular disc-like flanges 35 formed at respective distal ends of the tubular parts 34 and extending outward on a peripheral side of the tubular parts 34, and annular projections 36 protruding at respective edges of the mounting holes 33 on the second plate surface 32.

These mounting holes 33, tubular parts 34, flanges 35, and annular projections 36 are formed by performing drawing (press drawing) on the reinforcing plate at two locations spaced apart in the guide longitudinal direction of the reinforcing plate 30 as shown in FIG. 4 and FIG. 5.

Figure 6:
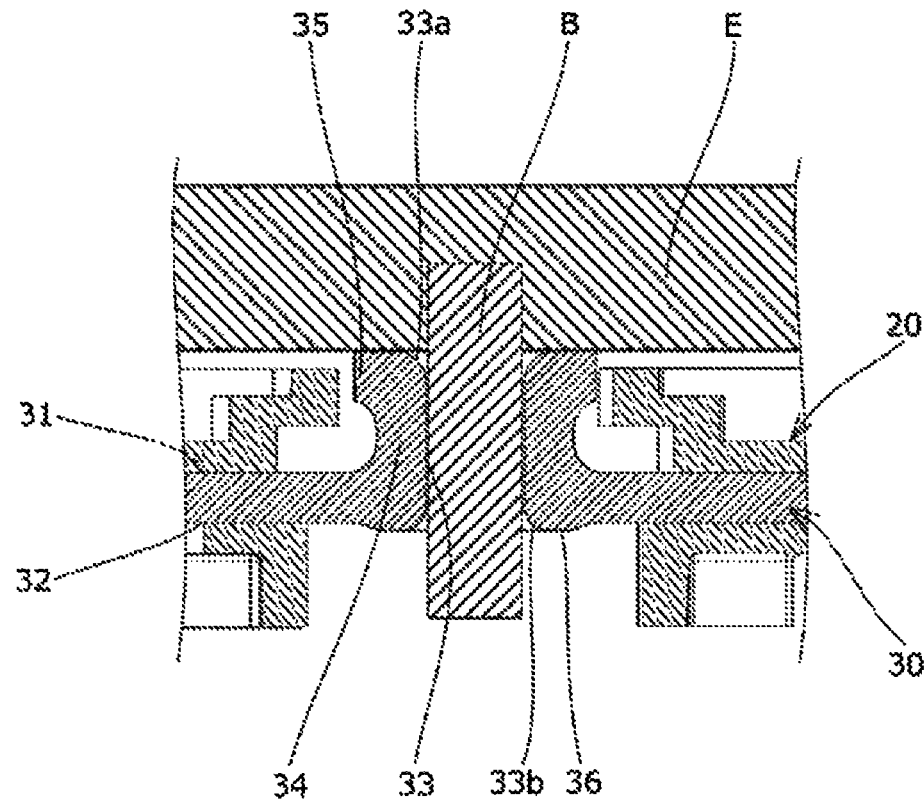
FIG. 6 is a cross-sectional view illustrating an example of an attachment design of the chain guide attached to an object of interest.

The mounting holes 33 are holes for mounting shafts B to pass through to attach the chain guide 10 to the engine block E as shown in FIG. 6. In this embodiment, the mounting shafts B are passed through the two mounting holes 33 to fixedly attach the chain guide 10 to the engine block E.

The distal end face of the flange 35 (tubular part 34) on the side facing the engine block E is formed flat so that this face contacts with the engine block E in a larger area and the chain guide 10 can be attached to the engine block E stably.

The first plate surface 31 and second plate surface 32 include a plurality of surface irregular parts 31a and 32a around each tubular part 34 (and annular projection 36) in stripes along a plurality of (five in this embodiment) imaginary circles concentric to the tubular parts 34 as shown in FIG. 4 and FIG. 5.

These surface irregular parts 31a and 32a are formed on the first plate surface 31 and second plate surface 32 as a result of a pressing process carried out on a blank sheet of the reinforcing plate 30 a number of times during the drawing process mentioned above. More specifically, the surface irregular parts are portions of the first plate surface 31 and second plate surface 32 undulated in a stepped, groove-like, protruded, or corrugated manner in a radial direction from the center of each tubular part 34.

At the distal end on the side of the flange 35 of the mounting hole 33, as shown in FIG. 6, a first radially expanded part 33a is formed, which is rounded and expanding radially outward relative to the guide width direction. At the distal end on the side of the second plate surface 32 of the mounting hole 33, a second radially expanded part 33b is formed, which is rounded and expanding radially outward relative to the guide width direction. These first and second radially expanded parts 33a and 33b of the mounting hole 33 are also formed as a result of the drawing process mentioned above.

While one embodiment of the present invention has been described in detail, the present invention is not limited to the above-described embodiment and may be carried out with various design changes without departing from the scope of the present invention set forth in the claims.

For example, while the chain guide was described as a component to be incorporated in a timing system of an engine in the embodiment above, the chain guide can be applied to various other equipment other than this.

The chain guide may not necessarily be applied to a transmission mechanism that uses a chain but can also be used for similar transmission mechanisms that use belts, ropes and the like, and can be applied in a variety of industrial fields.

For example, the material of the guide shoe may be selected from known suitable materials in accordance with various conditions such as elasticity, friction resistance, rigidity, durability, formability, cost, and so on. Synthetic resin materials are particularly suitable.

The material of the reinforcing plate may be selected from metal materials as appropriate in accordance with various conditions such as rigidity, durability, formability, cost, and so on.

While the chain guide is configured as a fixed guide fixedly attached to the engine block in the embodiment described above, the chain guide may be configured as a pivotal guide pivotally supported inside the engine room. If the chain guide is configured as a pivotal guide, there need be only one mounting hole in the reinforcing plate for passing the mounting shaft and the like for attaching the chain guide to the engine block.

While the surface irregular parts are formed on both of the first and second plate surfaces of the reinforcing plate in the embodiment described above, the surface irregular parts may be formed at least on one of the first plate surface and the second plate surface.

What is claimed is:

1. A chain guide comprising a guide shoe that slidably guides a chain, and a reinforcing plate that reinforces said guide shoe, said guide shoe including a guide rail extending along a guide longitudinal direction, and a plate holding part accommodating said reinforcing plate inserted thereinto from a backside of said guide rail, said reinforcing plate including a first plate surface on one side thereof in a guide width direction, a second plate surface on an opposite side, a mounting hole extending through the reinforcing plate in the guide width direction, and a tubular part integral with said first plate surface and protruding from an edge of said mounting hole, at least one of said first, plate surface and said second plate surface including a plurality of surface irregular parts, on an outer peripheral side of said tubular part, in stripes along a plurality of imaginary circles concentric to said tubular part.

2. The chain guide according to claim 1, wherein said surface irregular parts are portions of the reinforcing plate which are undulated in a step-like, groove-like, protruded, or corrugated manner radially from a center of said tubular part.

3. The chain guide according to claim 1, wherein said second plate surface includes an annular projection protruding portion at an edge of said mounting hole.

4. The chain guide according to claim 1, wherein a flange extending on the outer peripheral side of said tubular part is formed at a distal end of the tubular part.

5. The chain guide according to claim 4, wherein said mounting hole includes a radially expanded part expanding radially outward relative to the guide width direction at a distal end of said flange.

\* \* \* \* \*